Dec. 24, 1957  J. HARRIS  2,817,102
DOCKBOARD ASSEMBLY
Filed Dec. 7, 1953  2 Sheets-Sheet 1

INVENTOR
John Harris.
BY Fearman & Fearman.
ATTORNEYS

Dec. 24, 1957  J. HARRIS  2,817,102
DOCKBOARD ASSEMBLY
Filed Dec. 7, 1953  2 Sheets-Sheet 2

INVENTOR.
John Harris
BY
Pearman Pearman
ATTORNEYS

United States Patent Office 2,817,102
Patented Dec. 24, 1957

2,817,102

DOCKBOARD ASSEMBLY

John Harris, Bay City, Mich.

Application December 7, 1953, Serial No. 396,614

7 Claims. (Cl. 14—71)

This invention relates to dockboard assemblies for use in bridging the space between surfaces of different height, such as a loading dock and the floor of a transport vehicle, and more particularly to a dockboard having a ramp which is automatically lowered into engagement with the floor of the vehicle when said transport vehicle is backed into position adjacent the front wall of the loading dock.

One of the prime objects of the invention is to design a dockboard assembly in which the ramp of the dockboard is automatically lowered into position by engagement with the rear end of the vehicle as it is backed into position, and need not be manually operated.

A further object of the invention is to provide a dockboard assembly including a ramp which is automatically returned to raised, inoperative position when the vehicle is driven or moved out of engagement therewith.

Another object of the invention is to design a dockboard assembly including a ramp which is automatically lowered into position as the transport vehicle is backed into position and whose movement is controlled by the movement of the vehicle, so that it always maintains the correct relative position with respect thereto, thus eliminating the necessity of adjusting and jockeying the vehicle and dockboard relative to one another.

A further object of the invention is to provide a dockboard assembly of the type described which is adjustable laterally along the dock.

A further object of the invention is to design a dockboard assembly of rugged and durable construction which is highly efficient in operation, and will have a long and useful tenure of service.

Another object of the invention is to provide a dockboard assembly which need not be permanently installed as part of the dock, and can be used in existing docks without altering their structure.

A further object of the invention is to provide a dockboard assembly which is light in weight and readily portable.

Another object of the invention is to design a dockboard assembly of this type wherein the elements which are engaged by the transport vehicle are free to move rearwardly beyond the distance required to lower the ramp into position so that the assembly will not be damaged if the vehicle is backed closer to the dock than intended.

A still further object of the invention is to design a dockboard assembly of simple and practical construction which can be very economically manufactured and assembled.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

Figure 1:
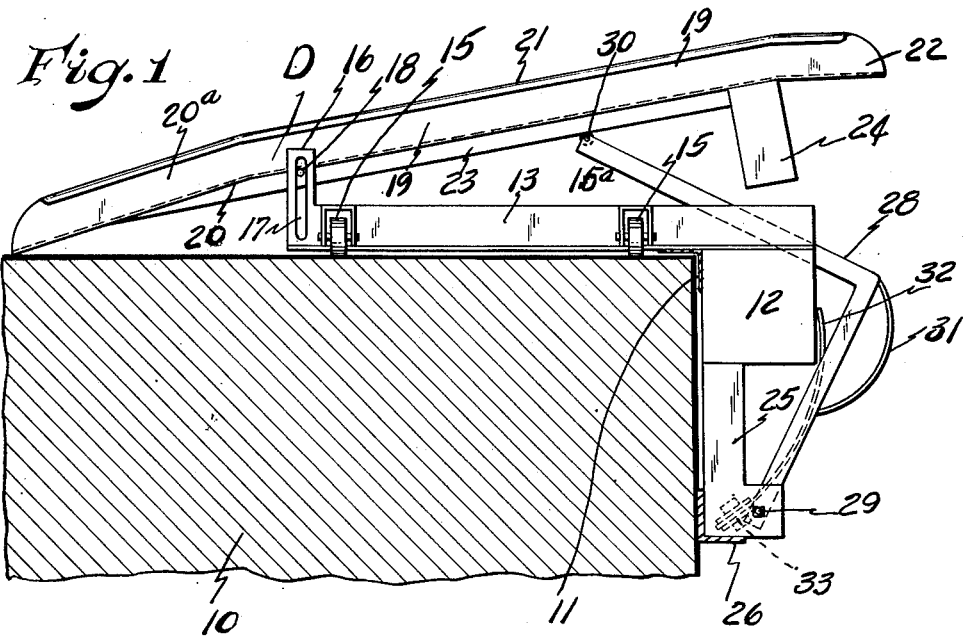
Fig. 1 is a side elevational view of my ramp assembly mounted on a dock with the dockboard shown in inoperative, raised position.

Referring now more particularly to the accompanying drawings in which I have shown the preferred embodiment of my invention, a numeral 10 generally indicates a loading and unloading platform or dock of conventional construction, and a letter D generally indicates my novel dockboard structure which is shown mounted thereon.

The dockboard structure D includes an angle member 11 which is mounted on the front edge of the dock 10 and secured to the member 11 are spaced-apart bumper blocks 12. Secured to the member 11 and blocks 12 are longitudinally disposed, substantially horizontal frame parts or members 13 which are provided with spaced-apart, laterally projecting roller forks 14, and transversely disposed antifriction rollers 15 are journaled on pins 15a as usual, these rollers supporting the members 13 above the platform of the dock 10 as shown. The rear ends of the members 13 are formed with vertical leg sections 16, said legs being slotted as at 17 to accommodate the trunnions 18 which are fixed to the lower face of the dockboard ramp 19 and extend laterally therefrom.

Figure 2:
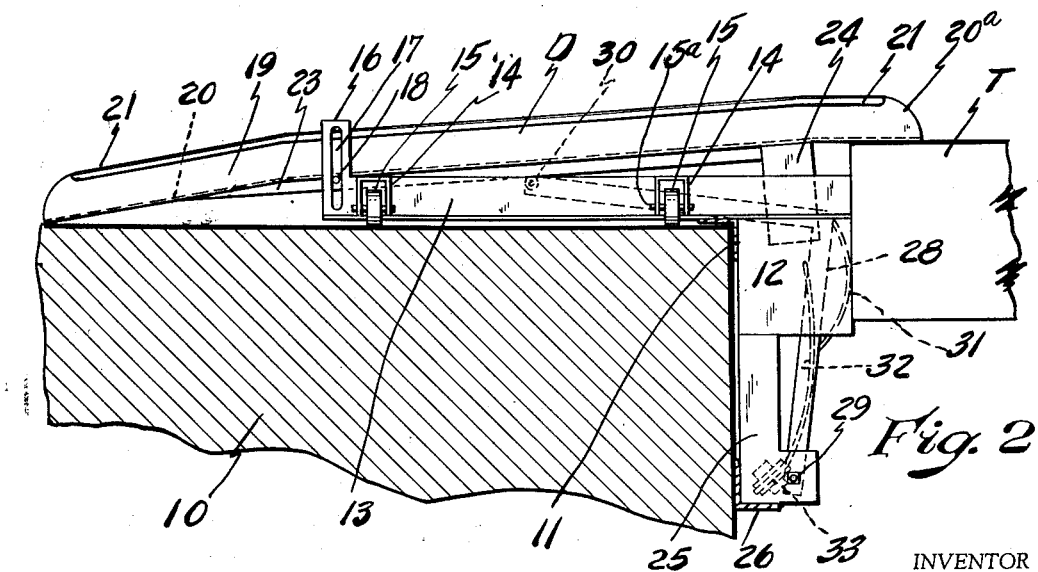
Fig. 2 is a similar view showing the ramp lowered into engagement with the floor of a truck or other transport vehicle.
Figure 3:
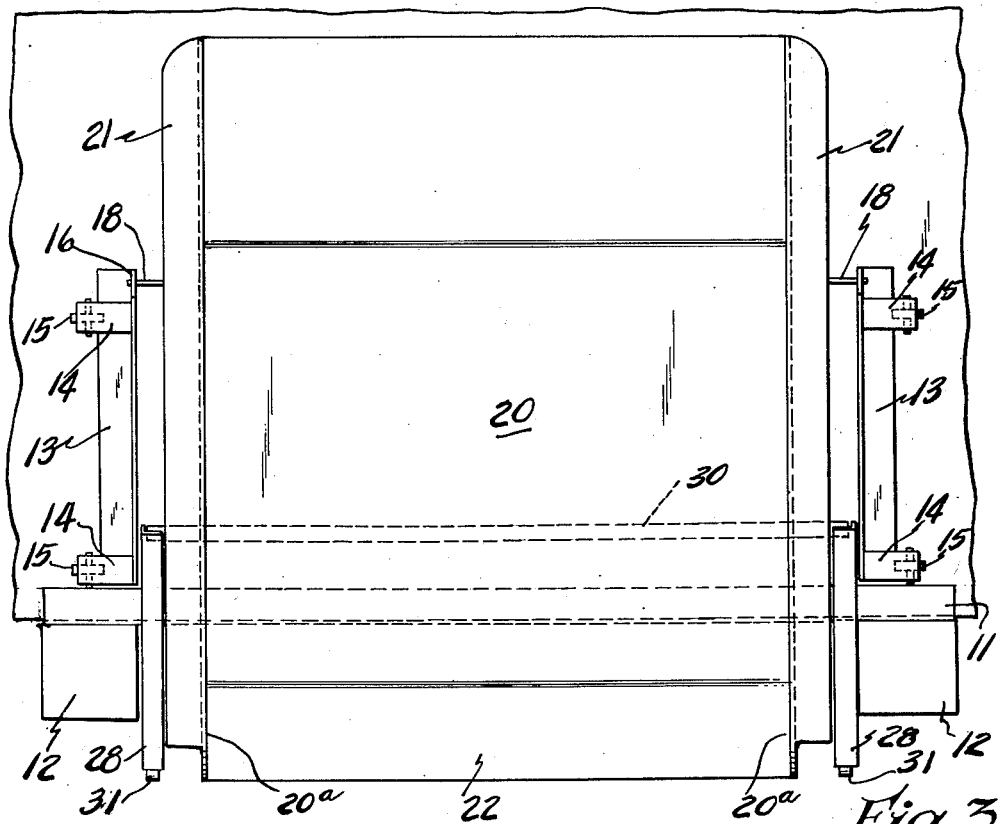
Fig. 3 is a fragmentary, top plan view of the dock and dockboard.
Figure 4:
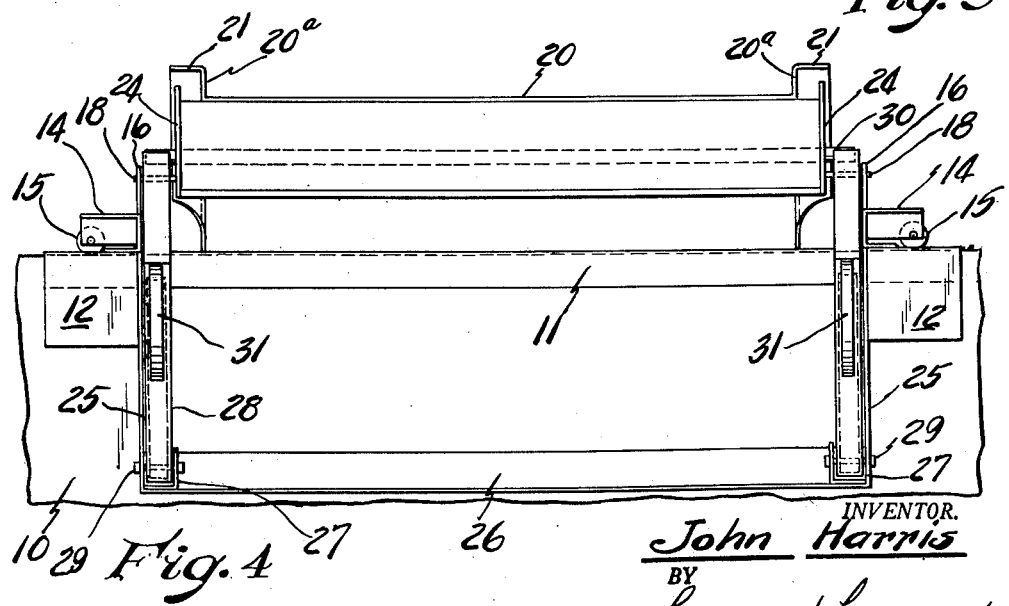
Fig. 4 is a fragmentary, front elevational view thereof.

The dockboard ramp 19, which is preferably of one-piece construction, includes a flat floor 20 formed with turned side rails 20a terminating in horizontally disposed handle flanges 21. As clearly shown in Figs. 1 and 2 of the drawings, the front end of the ramp overhangs the front edge of the dock and the front end is bent downwardly as at 22 so that it may rest on the floor of a truck or other transport vehicle T (see Fig. 2) which is shown backed into position adjacent the dock.

Fixed to the underside of the floor 20 of the dockboard ramp 19 is a reinforcing plate 23, and depending from the plate 23 is a U-shaped stop or foot 24 which prevents forward shifting of the dockboard relative to the transport vehicle. Depending frame parts or legs 25, connected by the angle member 26, depend from the blocks 12, the lower ends of the legs being turned inwardly and thence upwardly to form U-shaped bearing supports 27.

Bell crank levers or ramp supporting members 28 are rotatably mounted on pins 29 which span the supports 27, and it will be seen that these levers extend upwardly and thence rearwardly, and that a roller 30 connects the free ends thereof. Provided on the levers 28 are arcuate guards 31 and leaf springs 32 fixed at 33 to the lower ends of the leg 25 react between the members 28 and the frame parts 25 to force the levers 28 forwardly in the absence of any counteractive force applied to the guards 31, to the position shown in Fig. 1.

In operation, the dockboard ramp is normally held in raised, inoperative position until a truck T is backed into position adjacent the dock 10 between the bumpers 12, the rear end of the track engaging the guards 31, this pivoting the levers 28 rearwardly. The roller 30 riding rearwardly on the plate 23, permits the ramp to lower to the position shown in Fig. 2. Inasmuch as the movement of the ramp is dependent upon the movement of the truck, the ramp must always descend into properly supported position. When the truck is moved away from the dock, the springs 32 return the ramp to raised position. Since the dockboard structure overhangs the front face of the dock, it will be obvious that there can be no rearward shifting of the dockboard, but the structure can, of course, be moved laterally on the rollers 15 if desired.

From all of the foregoing, it will be apparent that I have perfected a very simple, practical and rugged, automatic dockboard which can be very economically manufactured from a suitable lightweight but strong material.

It is to be understood that various equivalent changes may be made in the various component elements of the device without departing from the spirit of the invention or the scope of the appended claims.

What I claim is:

1. A dockboard construction for use in conjunction with a dock having a substantially vertical front surface and a substantially horizontal upper surface at a height different from the height of a mobile platform to be loaded or unloaded at said dock, said construction comprising a frame having a substantially horizontal part to rest on the upper surface of said dock and a depending part to lie adjacent to the substantially vertical surface of said dock; a ramp member pivotally mounted adjacent its rear end on said substantially horizontal frame part for swinging movement from and to a normally raised position to and from a lowered position; a supporting member normally supporting said ramp member in said raised position; means rockably mounting said supporting member on one of said frame parts, said supporting member having a portion thereof projecting forwardly of said depending frame part in the path of movement of said mobile platform when said ramp member is in its said normally raised position, so as to transmit movement of said platform in a direction towards said dock to said supporting member to rock the latter and permit said ramp member to move to a lower position; and means reacting between one of said frame parts and one of said members to return said ramp member to its normally raised position when said platform moves in a direction away from said dock.

2. A construction as set forth in claim 1 including antifriction means interposed between said substantially horizontal frame part and the corresponding surface of said dock.

3. The construction set forth in claim 1 in which said ramp member is of such length that its forward end may project forwardly of said dock when said ramp member is in its said lowered position to rest upon said platform.

4. The construction set forth in claim 3 including means depending from said ramp member and located adjacent to the forward end of the latter so as to lie between said dock and said platform when said ramp member is in its said lowered position.

5. The construction set forth in claim 1 in which said supporting member is mounted on said depending frame part.

6. The construction set forth in claim 1 in which said reacting means is mounted to react between said depending frame part and said supporting member.

7. The construction set forth in claim 1 in which said supporting member is mounted on said depending frame part and in which said reacting means is mounted to react between said depending frame part and said supporting member.

References Cited in the file of this patent

UNITED STATES PATENTS

| 308,308 | Doten | Nov. 18, 1884 |
| 937,375 | Logan | Oct. 19, 1909 |
| 2,449,829 | Agren | Sept. 21, 1948 |
| 2,626,411 | Palmer | Jan. 27, 1953 |
| 2,739,325 | Grace | Mar. 27, 1956 |

OTHER REFERENCES

Dockboard Incorporated—a pamphlet entitled Hi Lo Self Adjusting Dockboard.